US006862265B1

United States Patent
Appala et al.

(10) Patent No.: US 6,862,265 B1
(45) Date of Patent: Mar. 1, 2005

(54) WEIGHTED FAIR QUEUING APPROXIMATION IN A NETWORK SWITCH USING WEIGHTED ROUND ROBIN AND TOKEN BUCKET FILTER

(75) Inventors: Syam Sundar V. Appala, Santa Clara, CA (US); Bahadir Erimli, Campbell, CA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 0 days.

(21) Appl. No.: 09/548,613

(22) Filed: Apr. 13, 2000

(51) Int. Cl.$^7$ .............................................. H04L 12/26
(52) U.S. Cl. ................... 370/235; 370/395.41; 370/412
(58) Field of Search ................. 370/230, 231, 370/235, 395.4, 395.41, 395.42, 412, 413, 395.21, 395.3, 395.43, 429

(56) References Cited

U.S. PATENT DOCUMENTS

| 5,278,828 A | * | 1/1994 | Chao ........................... 370/394 |
| 5,953,335 A | | 9/1999 | Erimli et al. |
| 5,978,356 A | * | 11/1999 | Elwalid et al. .............. 370/230 |
| 6,389,031 B1 | * | 5/2002 | Chao et al. .................. 370/412 |
| 6,430,187 B1 | * | 8/2002 | Park ............................ 370/397 |
| 6,563,829 B1 | * | 5/2003 | Lyles et al. ............. 370/395.21 |
| 6,611,522 B1 | * | 8/2003 | Zheng et al. ........... 370/395.21 |
| 6,633,575 B1 | * | 10/2003 | Koodli ......................... 370/412 |
| 6,643,260 B1 | * | 11/2003 | Kloth et al. ................. 370/235 |
| 6,647,011 B1 | * | 11/2003 | Zhou et al. ............. 370/395.41 |

OTHER PUBLICATIONS

H. Jonathan Chao and Necdet Uzun, A VLSI Sequencer Chip for ATM Traffic Shaper and Queue Manager, Bellcore and Polytechnic University, IEEE 1992, pp. 1276–1281.*

H. Jonathan Chao, Design of Leaky Bucket Access Control Schemes in ATM Networks, Bellcore, IEEE 1991, pp. 0180–018.*

Shenker et al, "General Characterization Parameters for Integrated Service Network Elements", Network Working Group, Request for Comments: 2215, Sep. 1997.

Shenker et al, "Specification of Guaranteed Quality of Service", Network Working Group, Request for Comments: 2212, Sep. 1997.

* cited by examiner

Primary Examiner—Alpus H. Hsu
Assistant Examiner—Toan Nguyen
(74) Attorney, Agent, or Firm—Manelli Denison & Selter PLLC; Leon R. Turkevich

(57) ABSTRACT

An integrated network switch having multiple network switch ports for outputting data frames also includes a dequeuing system for selectively supplying a data frame for output according to a specified priority by an output switch port. The dequeuing system includes, for each network switch port, a plurality of priority queues configured for holding assigned data frames based on respective priorities assigned by switching logic. A weighted round robin scheduler supplies the assigned data frames held in the priority queues to the output switch port according to a prescribed weighted round robin scheduling. In addition, the dequeuing system uses token bucket filters for selectively passing the assigned data frames to the respective priority queues in a manner that ensures that a given data frame having a large size does not interfere with bandwidth reserved for high-priority packets requiring guaranteed quality of service. Each token bucket filter selectively passes the corresponding assigned data frame to the corresponding priority queue based on a determined availability of at least a required number of tokens corresponding to a determined size of the corresponding assigned data frame. If the token bucket filter determines an insufficient number of tokens are available relative to the required number of tokens, the token bucket filter either drops the frame or shifts the frame to a lower priority queue. Hence, weighted fair queuing can be approximated using weighted round robin scheduling without interference by large-sized data packets.

14 Claims, 3 Drawing Sheets

WEIGHTED FAIR QUEUING APPROXIMATION IN A NETWORK SWITCH USING WEIGHTED ROUND ROBIN AND TOKEN BUCKET FILTER

BACKGROUND OF THE INVENTION

1. Field of the Invention

The present invention relates to switching of data packets in a non-blocking network switch configured for switching data packets between subnetworks.

2. Background Art

Local area networks use a network cable or other media to link stations on the network. Each local area network architecture uses a media access control (MAC) enabling network interface devices at each network node to access the network medium.

The Ethernet protocol IEEE 802.3 has evolved to specify a half-duplex media access mechanism and a full-duplex media access mechanism for transmission of layer 2 type data packets. A layer 2 type data frame (also referred to as a layer 2 type data packet) is defined as a data frame having a layer 2 header (e.g., Ethernet), a corresponding payload, and a cyclic redundancy check field (also referred to as a frame check sequence field) having a value based on the layer 2 header and the corresponding payload. The full-duplex media access mechanism provides a two-way, point-to-point communication link between two network elements, for example between a network node and a switched hub for simultaneous transmission and reception.

Switched local area networks are encountering increasing demands for higher speed connectivity, more flexible switching performance, and the ability to accommodate more complex network architectures. For example, commonly-assigned U.S. Pat. No. 5,953,335 discloses a network switch configured for switching layer 2 type Ethernet (IEEE 802.3) data packets between different network nodes; a received layer 2 type data packet may include a VLAN (virtual LAN) tagged frame according to IEEE 802.1p (802.1D) protocol that enables the network switch to perform more advanced switching operations. For example, the VLAN tag may specify another subnetwork (via a router) or a prescribed group of stations.

A particular concern in high-performance switches is the allocation of switch resources, such as output bandwidth, to different priority queues. Weighted fair queuing is a scheduling algorithm used to prioritize resources, where a certain output queue will be given a higher output bandwidth based on determined priorities. Weighted fair queuing, however, cannot be economically implemented in hardware because of complex processing requirements involving calculation of real numbers and a virtual clock implementation.

Weighted round robin is an integer-based scheduling algorithm that is substantially less complex and hence easier to implement in hardware. However, implementation of the weighted round robin in a network switch introduces additional problems, depending on the resource that the integer represents. For example, if weighted round robin scheduling is used to service the data flows on a byte basis, latencies may be introduced that disrupt the desired fair sharing behavior. If weighted round robin scheduling is used to service the data flows on a packet basis, there may be a chance that a flow having a large sized packet may unfairly use up all available bandwidth, depriving other flows from obtaining the requested bandwidth.

SUMMARY OF THE INVENTION

There is a need for an arrangement that enables a network switch to perform priority based switching of untagged layer 2 type data packets. In particular, there is a need for an arrangement that enables a network switch to perform prioritization of layer 2 type data, using a weighted round robin scheduling, while preventing relatively large sized data packets from unfairly utilizing reserved bandwidth.

These and other needs are attained by the present invention, where an integrated network switch having multiple network switch ports for outputting data frames also includes a dequeuing a, 20 system for selectively supplying a data frame for output according to a specified priority by an output switch port. The dequeuing system includes, for each network switch port, a plurality of priority queues configured for holding assigned data frames based on respective priorities assigned by switching logic. A weighted round robin scheduler supplies the assigned data frames held in the priority queues to the output switch port according to a prescribed weighted round robin scheduling. In addition, the system uses token bucket filters for selectively passing the assigned data frames to the respective priority queues in a manner that ensures that a given data frame having a large size does not interfere with bandwidth reserved for high-priority packets requiring guaranteed quality of service. Each token bucket filter selectively passes the corresponding assigned data frame to the corresponding priority queue based on a determined availability of at least a required number of tokens corresponding to a determined size of the corresponding assigned data frame. If the token bucket filter determines an insufficient number of tokens are available relative to the required number of tokens, the token bucket filter drops the frame or assigns a lower priority to the frame. Hence, weighted fair queuing can be approximated using weighted round robin scheduling without interference by large-sized data packets.

One aspect of the present invention provides a method in an integrated network switch. The method includes assigning a received data packet to a selected one of a plurality of priority queues for an output switch port, and determining whether the selected one priority queue has at least a required number of tokens corresponding to a determined size of the received data packet, the selected one priority queue having an available number of tokens based on outputting data packets of respective determined sizes from the corresponding selected one priority queue relative to a prescribed token regeneration rate. The received data packet is selectively supplied to the selected one priority queue based on the selected one priority queue having at least the required number of tokens. The received data packet is output from the selected one priority queue, relative to the plurality of priority queues, for transmission by the output switch port based on a prescribed weighted round robin scheduling between the priority queues. The selected supply of the received data packet to the selected priority queues based on the selected one priority queue having at least the required number of tokens ensures that unfairness is not introduced into the prescribed weighted round robin scheduling due to an unusually large data packet. Hence, the prescribed weighted round robin scheduling can be implemented for outputting of data packets held by the priority queues while maintaining fairness for assigned priorities within the priority queues.

Another aspect of the present invention provides an integrated network switch comprising a plurality of network switch ports configured for outputting data frames, switching logic configured for selecting, for a received data frame, at least one of the network switch ports as an output switch port and assigning a priority from a plurality of priorities, and a dequeuing system. The dequeuing system is configured for selectively supplying the received data frame to the output switch port. The dequeuing system includes, for each network switch port, a plurality of priority queues, respective token bucket filters, and a weighted round robin scheduler. The priority queues are configured for holding assigned data frames based on the respective priorities assigned by the switching logic. The token bucket filters are configured for selectively passing the assigned data frames to the respective priority queues. In particular, each token bucket filter selectively passes each corresponding assigned data frame to the corresponding priority queue based on a determined availability of at least a required number of tokens corresponding to a determined size of the corresponding assigned data frame. Once the assigned data frames are held in the priority queues, the weighted round robin scheduler is configured supplying the assigned data frames held in the priority queues to the output switch port according to a prescribed weighted round robin scheduling.

Additional advantages and novel features of the invention will be set forth in part in the description which follows and in part will become apparent to those skilled in the art upon examination of the following or may be learned by practice of the invention. The advantages of the present invention may be realized and attained by means of instrumentalities and combinations particularly pointed in the appended claims.

BRIEF DESCRIPTION OF THE DRAWINGS

Reference is made to the attached drawings, wherein elements having the same reference numeral designations represent like element elements throughout and wherein.

BEST MODE FOR CARRYING OUT THE INVENTION

Figure 1:
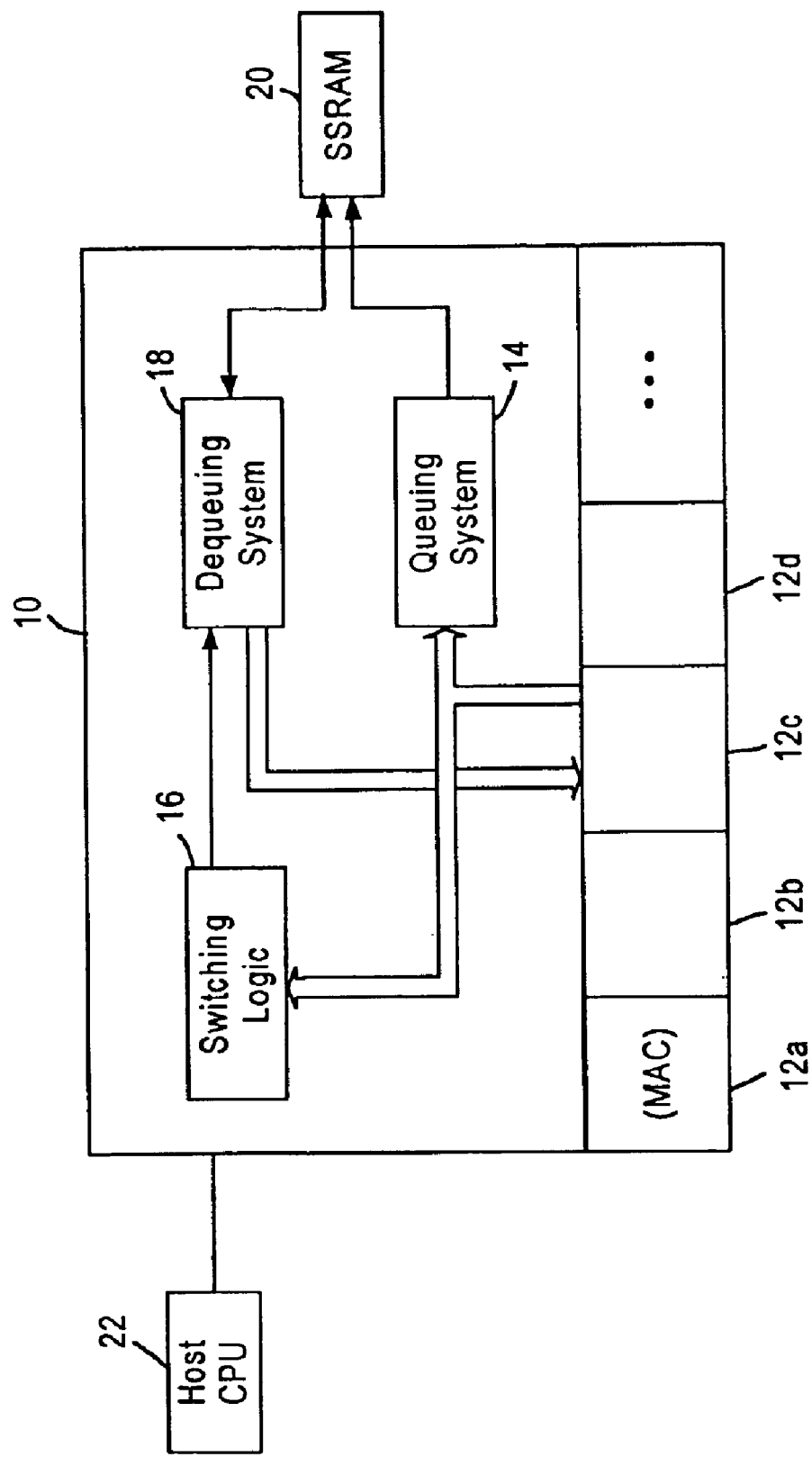
FIG. 1 is a block diagram of a network switch configured for switching layer 2 type data packets according to an embodiment of the present invention.

FIG. 1 is a block diagram illustrating an integrated (i.e., single chip) multiport switch 10 having switch ports 12 that include a media access controller (MAC), enabling transmission and reception of layer 2 type data packets between network stations at 10, 100, or 1000 Mbps according to IEEE 802.3 protocol. The multiport switch 10 also includes a queuing system 14, switching logic 16, and a dequeuing system 18. The queuing system 14 is configured for storing received data packets in a buffer memory 20, for example an SSRAM, and the dequeuing system 14 is configured for selectively supplying the received data frames to output switch ports 12, determined by the switching logic 16, based on an assigned priority selected by the switching logic 16.

The switch 10 is controlled and configured by a host CPU 22. The host CPU 22 controls the overall operations of the corresponding switch 12, including programming of the switching logic 16 and A the dequeuing system 18, described below.

The switching logic 16 is configured for making frame forwarding decisions for received layer 2 type data packets. In particular, the switching logic 16 is configured for identifying for each received data packet at least one output switch port 12, for example based on layer 2 switching and/or layer 3 (and above) switching operations. The switching logic 16 is also configured for performing switching decisions that implement user defined switching policies; such user-defined switching policies may include granting sufficient switch resources to ensure a guaranteed quality of service (e.g., reserved bandwidth or guaranteed latency) for a received layer 2 type data packet having a prescribed user-selected attribute, for example having been received on a selected ingress port, having a prescribed MAC or IP source or destination address, or having been determined to belong to a prescribed flow, for example an IGMP media flow. Use of policy-based switching decisions by the switching logic 16, enables the switching logic 16 to make intelligent decisions as far as how to handle a packet, including advanced forwarding decisions, and whether a packet should be considered a high-priority packet for latency-sensitive applications, such as video or voice.

According to the disclosed embodiment, the dequeuing system 18 supplies the data frames to the output switch ports 12, based on the switching decisions made by the switching logic 16 and according to a weighted fair queuing approximation that enables high-priority packets to be output on the selected output port 12 according to a guaranteed quality of service. In particular, the dequeuing system 18 determines, for each network switch port 12, whether a data packet having an assigned priority should be supplied to a corresponding priority queue, based on the size of the data packet, for transfer to the corresponding output port 12 according to a prescribed weighted round robin scheduling; if the dequeuing system 18 determines that the size of the data packet would disturb the prescribed weighted round robin scheduling by overwhelming the assigned bandwidth for the corresponding priority queue, the dequeuing system 18 drops the data packet. If, however, the dequeuing system 18 determines that the data packets may be transferred to the corresponding priority queue for transfer in accordance with the prescribed weighted round robin scheduling, the dequeuing system 18 transfers the data packet accordingly.

Figure 2:
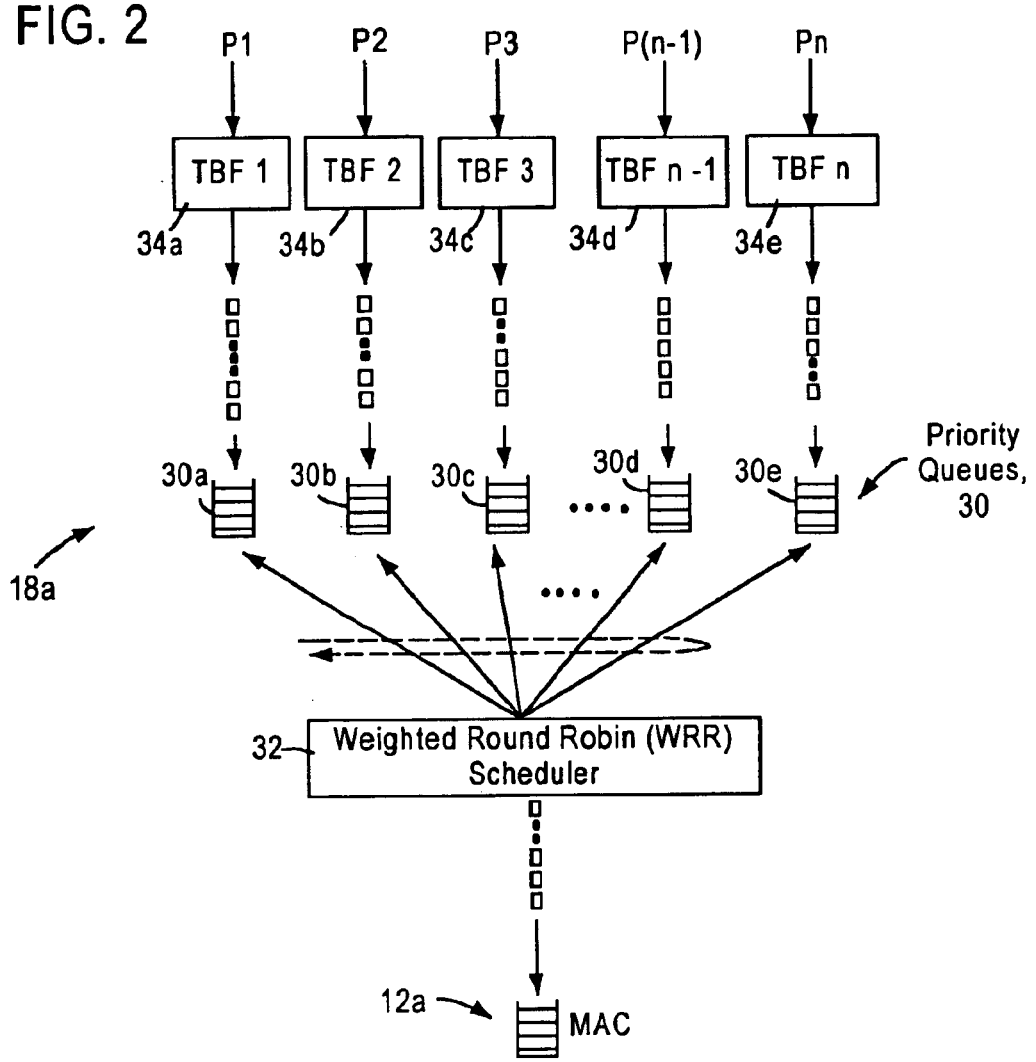
FIG. 2 is a diagram illustrating in further detail the dequeuing system of FIG. 1.

FIG. 2 is a diagram illustrating the dequeuing system 18a for a corresponding output port 12a according to an embodiment of the present invention. In particular, the dequeuing system 18a is configured for selectively supplying a received data frame, assigned a priority (P) from a plurality of priorities (P1, P2, P3, . . . P(n−1), Pn), to the corresponding network switch port 12a based on the assigned priority (P) and the size of the data packet. Hence, the network switch 10 includes a set of dequeuing systems (e.g., 18a, 18b, 18c, and 18d) serving respective output switch ports (12a, 12b, 12c, and 12d). Only the dequeuing system portion 18a for the output switch port 12a is illustrated in FIG. 2 for simplicity.

The dequeuing system 18a includes a plurality of priority queues 30a, 30b, 30c, 30d, and 30e configured for holding assigned data frames based on the respective priorities (e.g., P1, P2, P3, . . . P(n−1), Pn) assigned by the switching logic 16. In particular, FIG. 2 illustrates that the switching logic 16 selects the network switch port 12a as an output port for a received data packet, and that the switching logic 16 assigns the received data packet to have a designated priority (P) selected from one of the available priorities P1, P2, P3, P(n-1), Pn. The dequeuing system also includes a weighted round robin (WRR) scheduler 32 configured for supplying the data frames held in the priority queues 30 to the corresponding output switch port 12a and according to a prescribed weighted round robin scheduling.

Normally information associated with the received data packet (for example, a frame pointer specifying an identity of the received data packet) would automatically be stored in one of the priority queues 30a, 30b, 30c, 30d, and 30e based on the corresponding designated priority. As described above, however, such an arrangement may adversely affect the prescribed weighted round robin scheduling implemented by the weighted round robin scheduler 32 if a low-priority data packet is unusually large. For example, assume that the weighted round robin scheduler 32 is programmed by the host CPU 22 to output five data packets from the priority queue 30a, followed by four data packets from the priority queue 30b, followed by three data packets from the priority queue 30c, followed by two data packets from the priority queue 30d, followed by one data packet from the priority queue 30e. If the priority queue 30a stores frame pointers for five 64 byte frames and the priority queue 30e stores a frame pointer for a single 24 byte flame, then the servicing of the single 1024-byte frame by the weighted round robin scheduler 32 may require utilization of the bandwidth reserved for the data frames identified within the high-priority queue 30a, resulting in an unfair distribution of the output bandwidth of the network switch port 12a.

Figure 3:
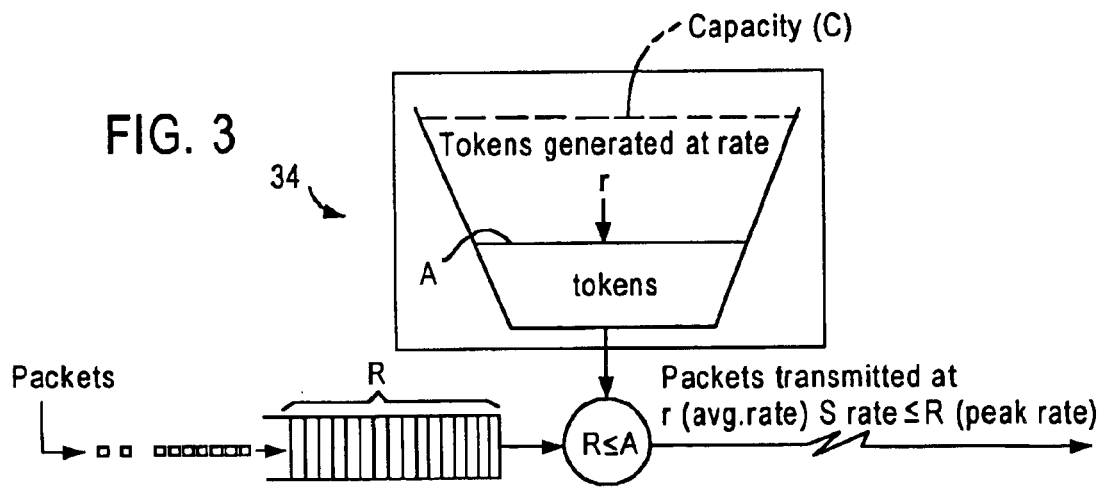
FIG. 3 is a diagram illustrating the token bucket filter of FIG. 2.

According to the disclosed embodiment, the dequeuing system includes token bucket filters 34 configured for selectively passing the assigned data frames to the respective priority queues 30 based on the size of the corresponding data frame. FIG. 3 is a diagram illustrating the token bucket filters 34. The token bucket filter (e.g., 34e) determines whether the corresponding priority queue (e.g., 30e) has available (A) at least the required number of tokens (R) corresponding to the determined size of the received data packet, and relative to the token regeneration rate (r) set by the host CPU 22. In particular, a token is needed for each byte of a data frame, such that a data frame having a size of 1024 bytes requires 1024 tokens. If the token bucket filter 34 determines that there is a sufficient number of tokens to serve the received data packet (R<A), the token bucket filter 34 passes the received data packet to the corresponding priority queue 30 and deducts deserved number of tokens (R) from the available number (A) of tokens in the bucket filter 34. In addition, the tokens are regenerated at a prescribed rate, for example a rate corresponding to the guaranteed bandwidth for the data packets assigned to the corresponding priority queue. However if the token bucket filter 34 determines that there are an insufficient number of tokens to serve the received data packet (R>A), then the token bucket filter 34 drops the received data packet. Hence, the token bucket filter 34 ensures that a received data packet does not adversely affect the guaranteed bandwidth implemented by the weighted round robin scheduler 32.

Figure 4:
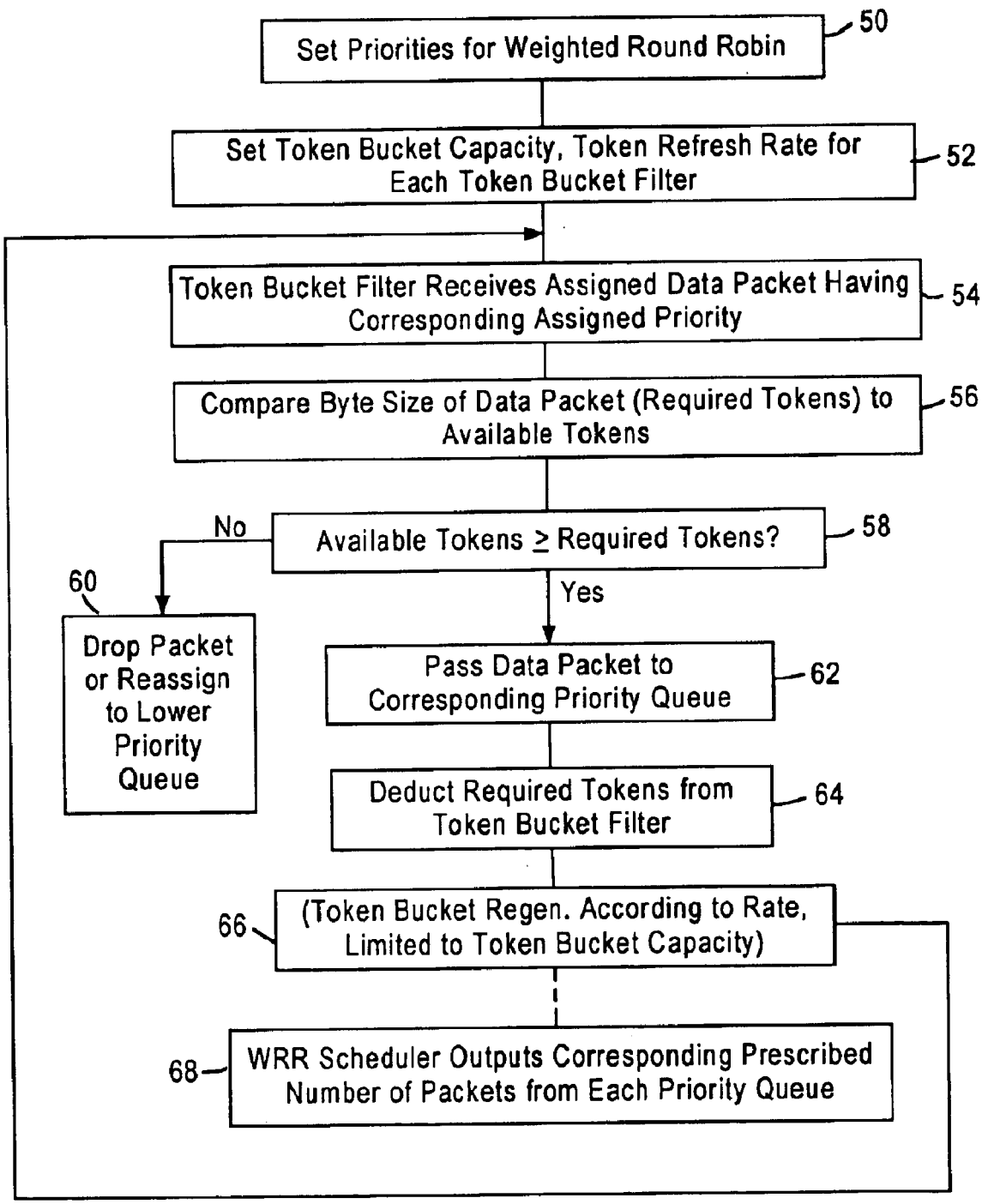
FIG. 4 is a diagram illustrating the method of outputting data packets to an output switch port by the dequeuing system according to an embodiment of the present invention.

FIG. 4 is a diagram illustrating the method of approximating weighted fair queuing by combined use of the token bucket filter and the weighted round robin scheduling according to an embodiment of the present invention. The method begins in step 50, where the CPU 22 sets the priorities for servicing the queues 30 by the weighted round robin scheduler 32 based on detection of data flows that require a guaranteed quality of service. For example, the host CPU 22 may set the weighted round robin scheduler 32 to output in sequence up to five packets, four packets, three packets, two packets, and one packet form priority queues 30a, 30b, 30c, 30d, and 30e, respectively. The host CPU 22 may set these priorities for the 100 Mbps switch port 12a based on prescribed data flows, for example voice data requiring a guaranteed latency at 20 Mbps for priority queue 30a, lower-priority video stream data requiring an output bandwidth of 30 Mbps for priority queue 30b, and the remaining 50 MHz of bandwidth for unprioritized traffic on priority queue 30c.

The host CPU 22 than sets the token bucket capacity (C) and the token regeneration rate (r) for each token bucket filter 30 in step 52. In particular, each token bucket filter 30 may have its own corresponding token bucket capacity and token regeneration rate, depending on the priority of the corresponding priority queue; hence, the token bucket filter 34a may have a higher capacity (C) and a faster token regeneration rate (r) for the corresponding higher priority queue 30a, compared to the token bucket filter 34e used to manage the burstiness of lower priority traffic. After configuration of the token bucket filters 34 and the weighted round robin scheduler 32 by the host CPU 22, the dequeuing system 18 can begin implementing switching decisions by the switching logic 16. In particular, the token bucket filter (e.g., 34c) receives in step 54 from the switching logic 16 an assigned data packet in the form of a frame pointer for a data packet having a corresponding assigned priority (e.g., P3).

The token bucket having received the assigned data packet (e.g., 34c) compares the byte size of the data packet, corresponding to the number of required tokens (R), to the number of available tokens (A) for the corresponding priority queue 30c in step 56. If in step 58 the number of available tokens (A) is not greater than or equal to the number of required tokens (R), the token bucket filter (e.g., 34c) drops the data packet, or alternately assigns a lower priority (such as a "best-effort priority queue") to the packet, in step 60. Hence, the token bucket filter drops the data packet if the size of the data packet would cause the assigned output bandwidth for the corresponding priority queue to be exceeded. However if in step 58 the number of available tokens (A) is greater than or equal to the number of require tokens (R), indicating the data packet would not overwhelm the corresponding assigned bandwidth, the token bucket filter (e.g., 34c) passes the data packet to the corresponding priority queue (e.g., 30c) in step 62.

The token bucket filter then deducts the number of available tokens in step 64 based on the number of tokens required to output the data packet (e.g., A'=A−R). Hence, the deduction of tokens from the token bucket filter 34 relative to the corresponding capacity ensues that burst traffic is not overwhelm the corresponding assigned bandwidth. The token bucket (e.g., 34c) selectively adds new tokens for the corresponding priority queue (e.g., 30c) in step 66 based on the corresponding prescribed token regeneration rate (r), up to the prescribed token bucket capacity (C). Hence, the token bucket filters 34 enable the weighted round robin scheduler 32 to output the corresponding prescribed number of packets from each priority queue in step 68, without the presence of large data packets that may interfere with the guaranteed output bandwidth requirements of the higher priority queues (e.g., 30a). The above-described priority scheme is maintained until an end of a data flow is detected, at which point the priority arrangement is terminated. A new priority scheme will be configured in step 50 upon detection of a new data flow.

While this invention has been described with what is presently considered to be the most practical preferred embodiment, it is to be understood that the invention is not limited to the disclosed embodiments, but, on the contrary, is intended to cover various modifications and equivalent arrangements included within the spirit and scope of the appended claims.

What is claimed is:

1. A method in an integrated network switch, the method comprising:

assigning a received data packet to a selected one of a plurality of priority queues for an output switch port;

determining whether the selected one priority queue has at least a required number of tokens corresponding to a determined size of the received data packet, the selected one priority queue having an available number of tokens based on outputting data packets of respective determined sizes from the corresponding selected one priority queue relative to a prescribed token regeneration rate;

selectively supplying the received data packet to the selected one priority queue based on the selected one priority queue having at least the required number of tokens; and outputting the received data packet from the selected one priority queue, relative to the plurality of priority queues, for transmission by the output switch port based on a prescribed weighted round robin scheduling between the priority queues.

2. The method of claim 1, wherein the selectively supplying step includes selectively one of dropping the received data packet and reassigning the received data packet to a lower priority queue, based on determining that the available number of tokens of the selected one priority queue is less than the required number of tokens.

3. The method of claim 1, further comprising deducting the required number of tokens from the selected one priority queue based on the supplying of the received data packet to the selected one priority queue.

4. The method of claim 3, further comprising setting each of the priority queue to have the corresponding prescribed token regeneration rate.

5. The method of claim 4, wherein the setting step further includes setting each of the priority queues to have a corresponding maximum capacity of tokens based on a corresponding prescribed quality of service.

6. The method of claim 3, wherein the outputting step includes:

accessing the selected priority queue according to a prescribed priority sequence specified by the prescribed weighted round robin scheduling;

outputting a first corresponding number of data packets specified by the prescribed weighted round robin scheduling, including the received data packet, from the selected priority queue for transmission by the output switch port.

7. The method of claim 6, further comprising:

accessing a second of the priority queues, following the selected priority queue, according to the prescribed priority sequence; and outputting a second corresponding prescribed number of data packets, specified by the prescribed weighted round robin scheduling, from the selected priority queue for transmission by the output switch port.

8. The method of claim 3, wherein the deducting step includes deducting the required number of tokens corresponding to a number of data bytes in the received data packet.

9. The method of claim 8, further comprising adding new tokens for the selected one priority queue based on the corresponding prescribed token regeneration rate, up to a corresponding prescribed maximum capacity of tokens.

10. An integrated network switch comprising:

a plurality of network switch ports configured for outputting data frames;

switching logic configured for selecting, for a received data frame, at least one of the network switch ports as an output switch port and assigning a priority from an available plurality of priorities; and a dequeuing system configured for selectively supplying the received data frame to the output switch port, the dequeuing system including, for each network switch port:

(1) a plurality of priority queues configured for holding assigned data frames based on the respective priorities assigned by the switching logic, (2) token bucket filters configured for selectively passing the assigned data frames to the respective priority queues, each token bucket filter selectively passing each corresponding assigned data frame to the corresponding priority queue based on a determined availability of at least a required number of tokens corresponding to a determined size of the corresponding assigned data frame, and (3) a weighted round robin scheduler configured supplying the assigned data frames held in the priority queues to the output switch port according to a prescribed weighted round robin scheduling.

11. The switch of claim 10, wherein each token bucket filter selectively one of drops the corresponding assigned data frame and reassigns the received data packet to a lower priority queue, based on determining that the corresponding available number of tokens is less than the required number of tokens.

12. The switch of claim 10, wherein each token bucket filter deducts the corresponding required number of tokens based on supplying the corresponding received data packet to the corresponding priority queue.

13. The switch of claim 12, wherein each priority queue adds new tokens based on a corresponding prescribed token regeneration rate, up to a corresponding prescribed maximum capacity of tokens.

14. The switch of claim 10, wherein the weighted round robin scheduler accesses the priority queues in a prescribed priority sequence, and supplies from each accessed priority queue a corresponding number of data frames to the output switch port.

* * * * *